United States Patent
Evertz et al.

(10) Patent No.: US 7,981,192 B2
(45) Date of Patent: Jul. 19, 2011

(54) METHOD AND DEVICE FOR PRODUCING BINDERLESS BRIQUETTES AND BRIQUETTES COMPRISING METAL CHIPS AND METAL DUSTS

(75) Inventors: Egon Evertz, Solingen (DE); Ralf Evertz, Leichlingen (DE); Stefan Evertz, Solingen (DE)

(73) Assignee: Egon Evertz KG(GmbH & Co), Solingen (DE)

( * ) Notice: Subject to any disclaimer, the term of this patent is extended or adjusted under 35 U.S.C. 154(b) by 17 days.

(21) Appl. No.: 12/376,835

(22) PCT Filed: Apr. 17, 2008

(86) PCT No.: PCT/DE2008/000657
§ 371 (c)(1),
(2), (4) Date: Feb. 9, 2009

(87) PCT Pub. No.: WO2008/138295
PCT Pub. Date: Nov. 20, 2008

(65) Prior Publication Data
US 2010/0147109 A1    Jun. 17, 2010

(30) Foreign Application Priority Data
May 11, 2007 (DE) .............. 102007022682

(51) Int. Cl.
*C22B 7/02* (2006.01)
*B22F 3/03* (2006.01)
*B22F 5/10* (2006.01)

(52) U.S. Cl. .............. 75/770; 419/38; 419/66

(58) Field of Classification Search ............ 419/38, 419/66; 425/29, 78; 75/770, 316; 428/546, 428/576
See application file for complete search history.

(56) References Cited

U.S. PATENT DOCUMENTS

| | | | | |
|---|---|---|---|---|
| 2,331,074 A * | 10/1943 | Jones | ............. | 75/522 |
| 3,249,039 A * | 5/1966 | Yo Jonghe | ............. | 100/96 |
| 3,864,092 A * | 2/1975 | Ravitz | ............. | 428/546 |
| 3,899,821 A * | 8/1975 | Ito et al. | ............. | 419/28 |
| 4,889,555 A | 12/1989 | Szekely et al. | ............. | 75/0.5 |
| 2003/0075014 A1 | 4/2003 | Ishihara et al. | ............. | 75/232 |
| 2004/0067155 A1 | 4/2004 | Girshov et al. | ............. | 419/38 |

FOREIGN PATENT DOCUMENTS

| | | |
|---|---|---|
| DE | 4416699 | 12/1994 |
| JP | 08188834 A * | 7/1996 |
| JP | 2000192156 A * | 7/2000 |
| RU | 1806211 | 3/1993 |
| SU | 1595630 | 9/1990 |

OTHER PUBLICATIONS

Derwent Acc No. 1991-169923, abstract of SU 1595630 A, published Sep. 30, 1990.*
Derwent Acc No. 1989-239742, abstract of SU 1458080 A, published Feb. 15, 1989.*

* cited by examiner

*Primary Examiner* — George Wyszomierski
*Assistant Examiner* — Tima M McGuthry-Banks
(74) *Attorney, Agent, or Firm* — Andrew Wilford

(57) ABSTRACT

The invention relates to a process for producing binderless briquettes from metal chips and metal dusts in which the metal chips are pressed into a cup-shaped form and the upwardly open cavity produced as a result is filled with metal dust, after which the opening is closed with a cover consisting of pressed metal chips.

5 Claims, 6 Drawing Sheets

METHOD AND DEVICE FOR PRODUCING BINDERLESS BRIQUETTES AND BRIQUETTES COMPRISING METAL CHIPS AND METAL DUSTS

CROSS REFERENCE TO RELATED APPLICATIONS

This application is the US national phase of PCT application PCT/DE2008/000657, filed 17 Apr. 2008, published 20 Nov. 2008 as WO2008/138295, and claiming the priority of German patent application 102007022682.0 itself filed 11 May 2007, whose entire disclosures are herewith incorporated by reference.

BACKGROUND OF THE INVENTION

DE 37 32 351 A1 (U.S. Pat. No. 4,889,555) already describes a process for producing binderless briquettes for charging a smelting operation, comprising metallic-iron-containing fine-grained steel plant dusts which are heated up and, while in the hot state, turned into briquettes on a roller briquetting press and are subsequently cooled. To avoid reoxidation, this is intended to take place under an inert atmosphere.

Disadvantageously, a considerable amount of energy is necessary here for heating up to the briquetting temperature in excess of 500°.

DE 44 16 699 A1 describes a process for utilizing metallic residual material, in particular chip material, in smelting furnaces, in which the small-sized chip material to be recycled is pressed together with slag- and/or fuel-forming dust, preferably dust containing SiO2 from filter systems, with up to 15% by weight, preferably 5 to 10% by weight, of dust being admixed with the amount of material to be pressed. In the case of this process, the amount of metal dusts is greatly restricted.

Attempts to press metal dusts that occur for example in grinding processes into briquettes without further additives failed as a result of the inadequate dimensional stability of the pressed product. Even slight impact or other force effects on a briquette body produced purely from dusts caused it to break up. The alternative of adding adhesives is laborious and also implies that, when the dusts are put to further use, the adhesives must first be removed again by heating.

In times of constantly increasing raw material prices, there is an urgent need to recycle in particular expensive metals and metal alloys that are contained in waste materials occurring in waste from machining operations, in particular grinding. However, a precondition for this is solid shaping, allowing such waste to be stored and transported without the risk of it breaking up. The same also applies correspondingly to the dusts originating from metal-processing processes that collect in filters.

OBJECT OF THE INVENTION

It is the object of the present invention to provide a process and a device with which metal chips and dusts of any composition can be processed into a transportable form without the addition of additives in a way that is cost-effective and allows easy handling.

SUMMARY OF THE INVENTION

This object is achieved by the available metal chips being pressed into a cup-shaped form and the upwardly open cavity produced as a result being filled with metal dust, after which the opening is closed with a cover consisting of pressed metal chips. This process is based on the inventive idea that, on account of their natural stability and deformability, metal chips can be pressed very well into a dimensionally stable body, which in the present case serves as a destruction-resistant enclosure for the metal dusts. The closable inner cavity of the cup-shaped metal-chip container is chosen according to the proportion of the metal dusts as a percentage of the metal chips. Since the cup-shaped form is in any case closed by a cover, it is not absolutely necessary to compact the filled metal dust by pressing, but this is recommendable to make optimum use of the filling capacity of the cup. In an advantageous way, this process technique does not require any heating of the metal material to be pressed, nor is it necessary to use adhesive-like binders that have to be driven out again before further use.

According to a development of the invention, the metal chips are pressed into a cover that corresponds to the cup form and is subsequently pressed with the open cup form, the pressing pressure preferably being applied at the rim of the cover. As an alternative to this, loose metal chips may be distributed on the metal dust located in the cup form and on the rim of the cup and subsequently be formed into a closable cover by means of a press. In the first-mentioned case, the cover is consequently separately formed from metal chips before it is bonded with the open cup-shaped metal-chip container by pressing. This process is suitable in particular whenever the cavity of the open metal-chip container is not completely filled with already pre-compacted metal chips. If, on the other hand, the metal-chip container is completely filled with already compacted metal dusts, so that the rim of the container and the metal dusts provide a substantially closed plane through which the force of reaction necessary for the pressing can be applied, the forming on of the cover by the second-mentioned method is recommendable. It is in any event essential that the briquette-like forms produced have a solid outer enclosure, substantially consisting of metal chips, which is also relatively dimensionally stable under pressure and impact loading. It goes without saying that this cup form does not have to consist completely of metal chips, provided that metal dusts contained in it do not exceed a low percentage of 5 to 10%.

It should be pointed out in particular that the cup form according to the invention can be shaped in any way up to and including the form of a plate, provided that a cavity adapted to the amount of metal dusts present is in each case available.

According to the invention, the product that can be returned to the production process comprises binderless briquettes which have a cup of pressed metal chips, a cover of pressed metal chips and a cavity that can be filled or is filled with metal dust. The cup and/or the cover preferably have a wall thickness of at least 4 cm. The briquette of metal chips with filled metal dust may take any form, in particular the form of a cylinder, the form of a cone, the form of a cube or the form of a bar. So-called undercuts, which cannot be achieved well by means of a pressing pressure, should be avoided.

To produce the said binderless briquette, according to a further refinement of the invention a device which comprises at least one female die and at least one male die corresponding thereto is used. The metal chips that can be introduced into the female die can be pressed into a cup by means of exerting pressure by the male die. The cup can subsequently be filled with metal dust and can be closed with a cover of pressed metal chips. One possibility is that the cover of pressed metal chips is produced in a separate pressing device before it is placed on the cup form already produced in the female die and pressed on by means of a corresponding male die. Alternatively, there is the possibility that, in one and the same pressing device, the cup form is first produced from metal chips, the cup-shaped cavity is then filled with metal dust piled up to the rim or with an allowance for compressibility, the dust is subsequently compacted, the metal chips are scattered on the rim of the cup and the compacted metal dusts and then compacted or the metal chips are scattered directly onto the metal dusts as a covering layer and then compacted together with the metal dusts. The female die has corresponding negative forms, which correspond to the desired positive forms of the briquettes to be produced.

BRIEF DESCRIPTION OF THE DRAWING

Further exemplary embodiments are represented in the drawings, in which.

SPECIFIC DESCRIPTION

Figure 1:
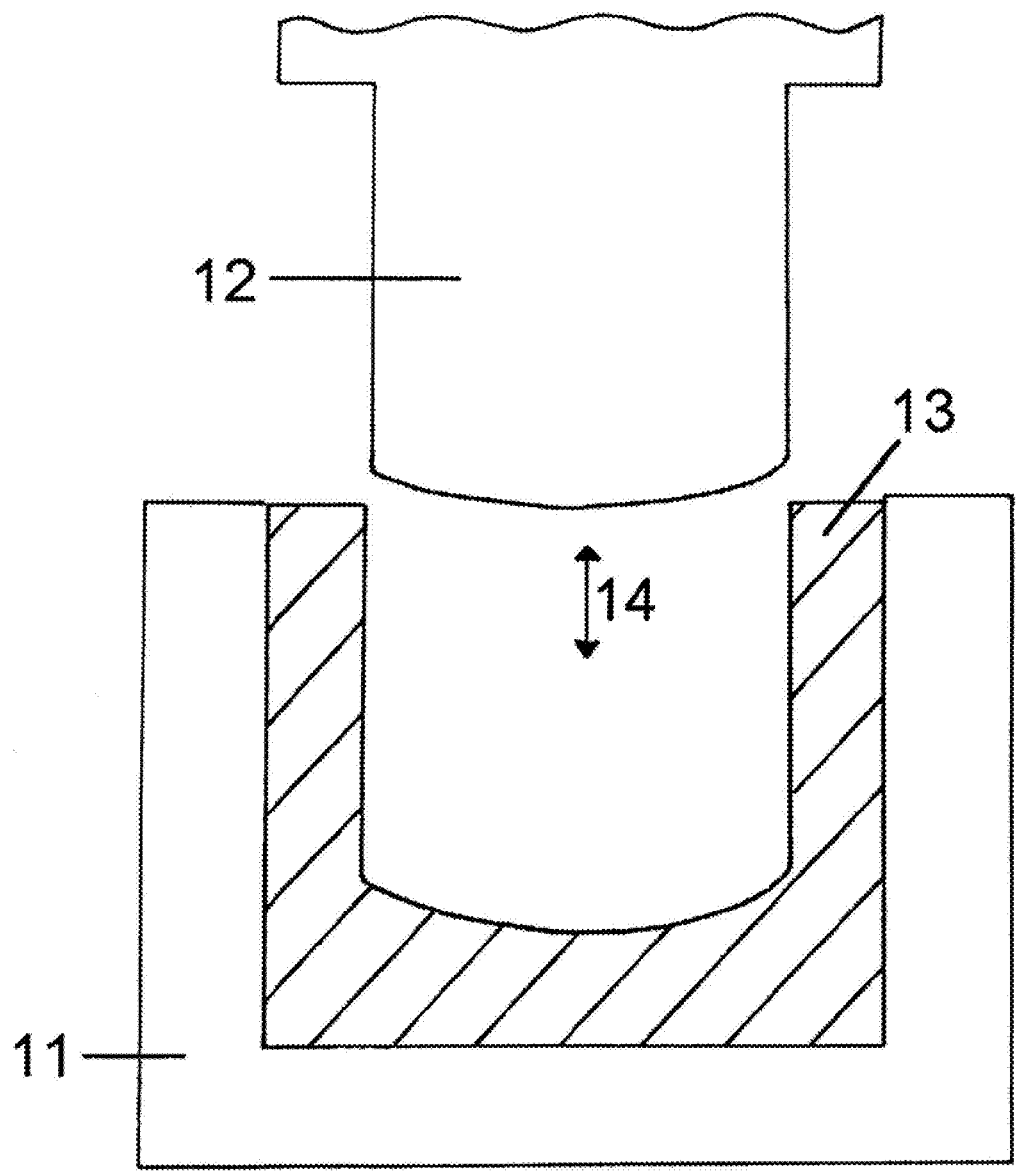
FIG. 1 shows a cross section through a female die, a male die and a pressed cup form.
Figure 2:
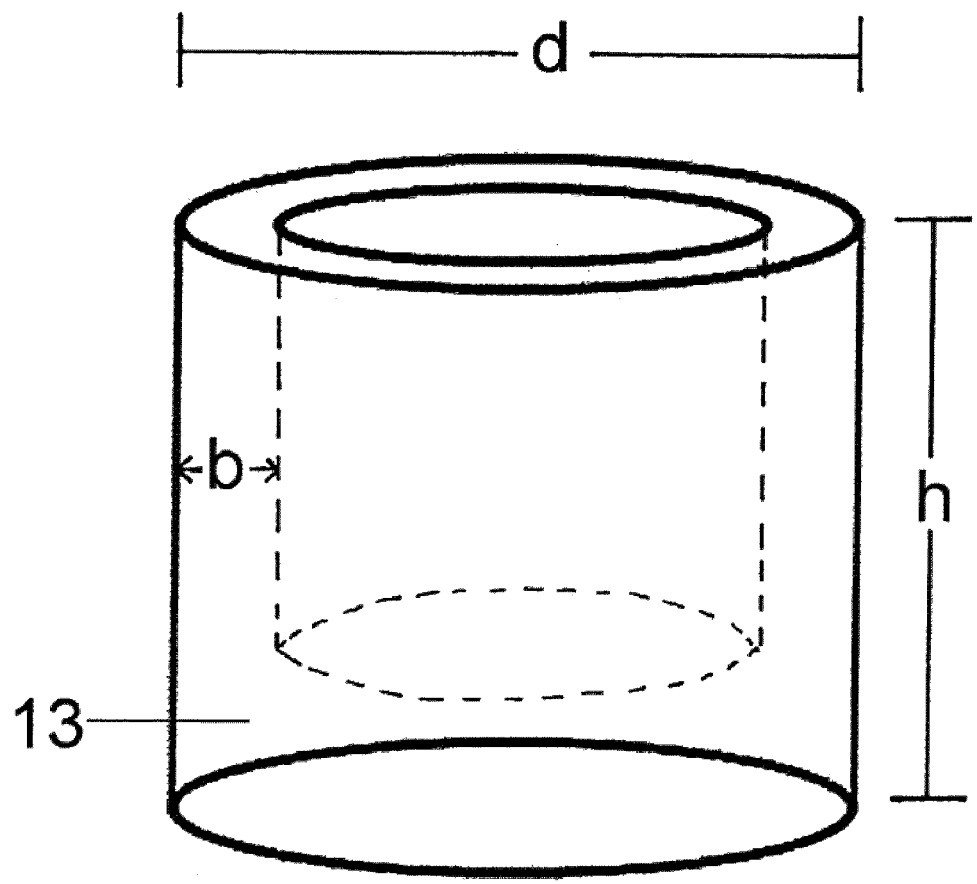
FIG. 2 shows a perspective representation of a cylindrical cup form.

In FIG. 1, the pressing process for producing a cup form 13 is schematically represented. For this purpose, loose metal chips are filled into the cavity of a female die 11. By exerting pressure with the male die 12, which is mounted movably in the direction 14, the metal chips are pressed into a dimensionally stable cup form 13 that is open at one end. FIG. 2 shows a perspective representation of the cup form 13 produced. With the cylindrical basic form represented here, the cup 13 has the height h, the outer diameter d and the wall thickness b.

Figure 3A:
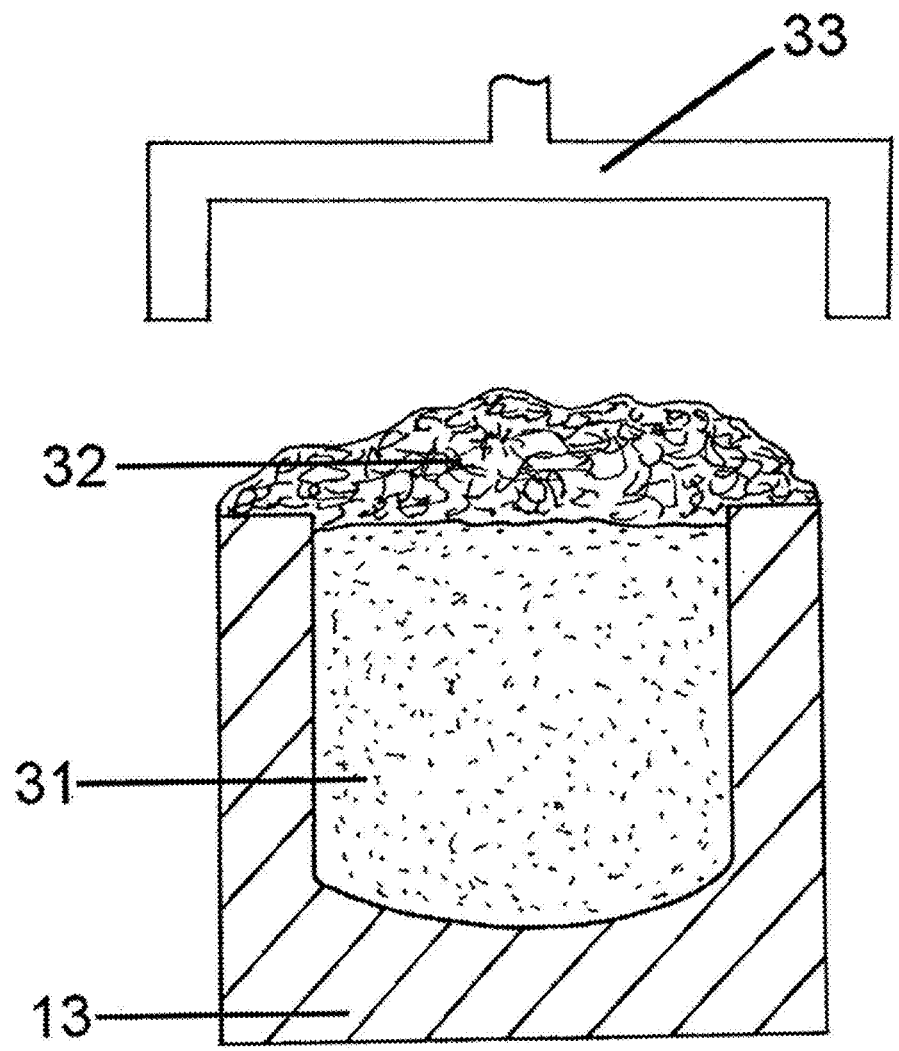
FIG. 3a shows a cup which is filled with metal dust and covered with loose metal chips and a punch.

After filling of the cup 13 formed from loose metal chips with metal dust 31, two alternative possibilities are provided for closing the cup 13 to form a briquette. FIG. 3a schematically shows the possibility of piling onto the filled cup loose metal chips 32, which are subsequently pressed by a punch 33 directly onto the cup 13 to form a compact and closing cover 42 (cf. FIG. 4). An advantage of this embodiment is that no intermediate space is produced between the cover 42 and the upper edge of the metal dust 31, whereby the volume available is optionally utilized.

Figure 3B:
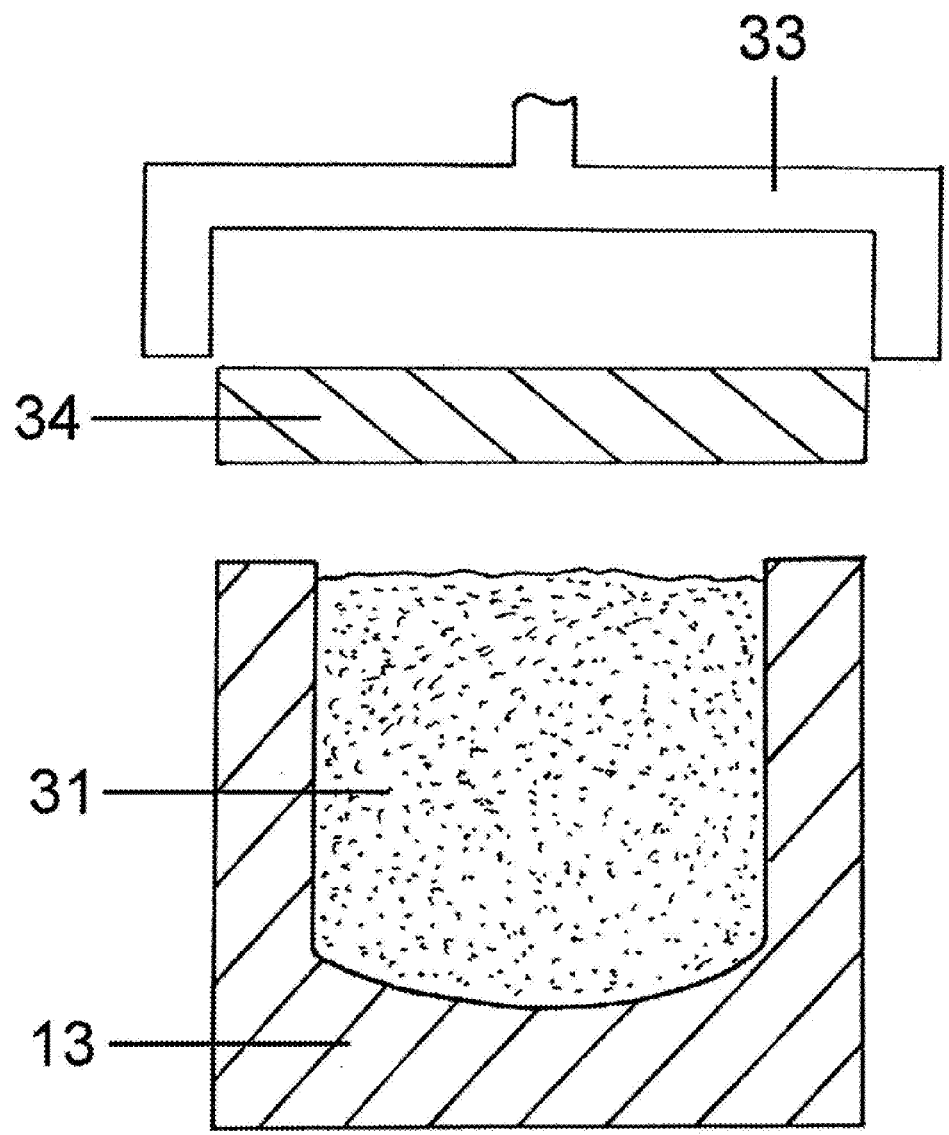
FIG. 3b shows a cup which is filled with metal dust and a pre-pressed cover consisting of metal chips (in an exploded representation)

According to FIG. 3b, a further refinement is provided such that a cover 34 pre-formed from metal chips 32 and pre-pressed from metal chips is pressed with a punch 33 onto the cup 13, so that a closed briquette is produced. An advantage of this embodiment is that the degree of filling with metal chips can be varied in any way desired.

Figure 4:
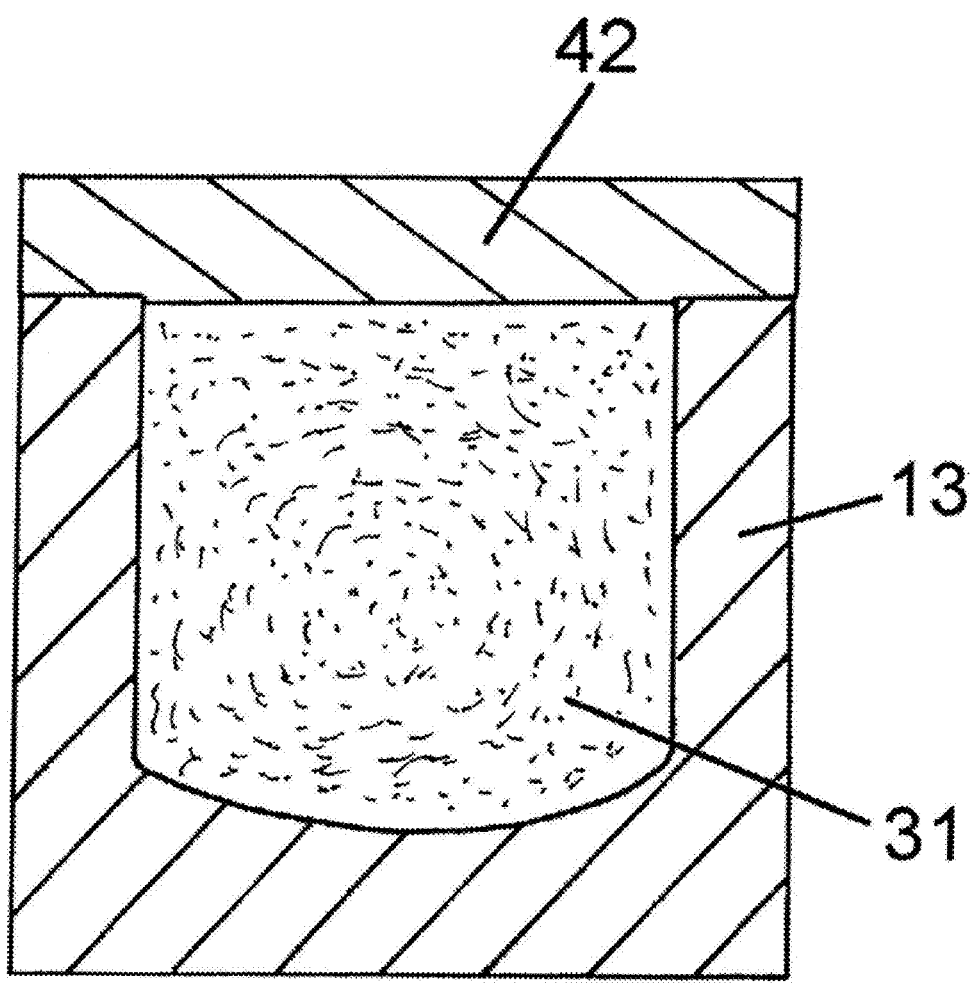
FIG. 4 shows a cross section through a briquette filled with metal dust.

However, common to both processes is that a closed briquette 41 filled with metal dust 31 is produced, as schematically represented in FIG. 4.

The metal chips and the metal dusts may originate from different processes and be put together in any desired way, so that, by way of the chemical composition of the metal chips and the metal dusts and their proportions as a percentage, it is possible to set desired dopings for further-processing processes in which the briquettes are introduced by melting.

Figure 5A:
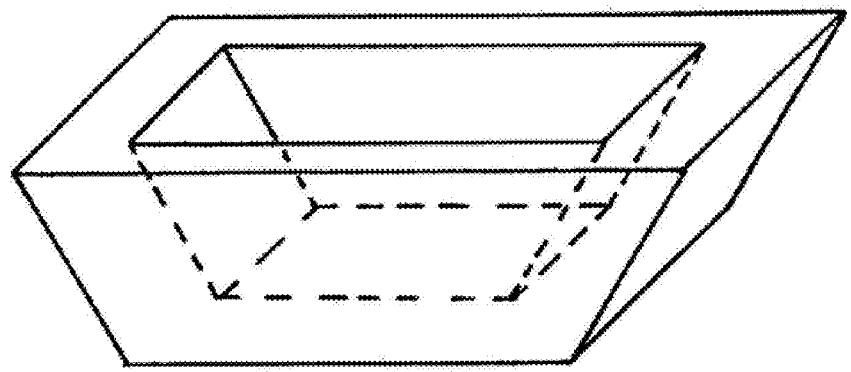
FIG. 5a shows a trapezoidal cup form and FIG. 5b shows a cuboidal cup form.
Figure 5B:
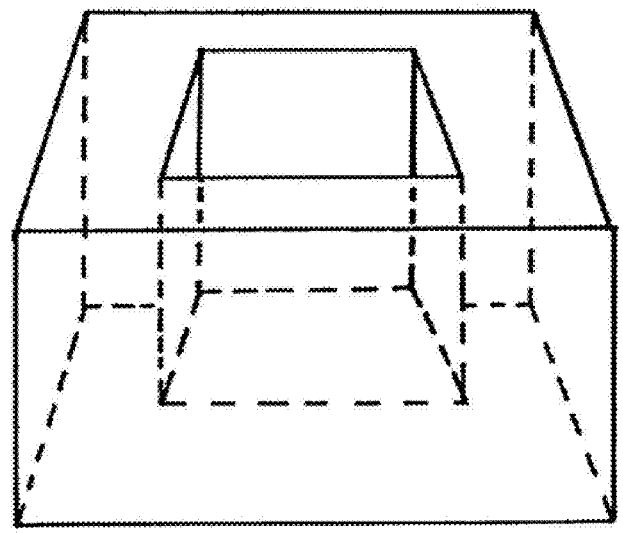

Further embodiments in the form of trapezoidal or cuboidal briquettes are represented by way of example in FIGS. 5a and 5b.

The invention claimed is:

1. A process for producing binderless briquettes from loose metal chips and metal dusts, the method comprising the steps of:
    pressing the metal chips into a cup-shaped female die to make a pressed body having an upwardly open cavity;
    filling the cavity with metal dust;
    thereafter upwardly closing the cavity with a cover consisting of pressed metal chips;
    distributing a layer of the loose metal chips on the metal dust forming the cavity and on a rim of the cup; and
    thereafter pressing the layer of metal chips into the cover by means of a press.

2. The process as claimed in claim 1, wherein the cover is made by
    pressing metal chips to form the cover such that it fits complementarily over the cavity, the cavity being upwardly closed by
    pressing the cover down over the cavity with pressure applied at a rim of the cover to close the cavity over the metal dust therein.

3. A process for producing binderless briquettes from loose metal chips and metal dusts, the method comprising the steps of:
    pressing the metal chips into a cup-shaped female die to make a pressed body having an upwardly open cavity;
    filling the cavity with metal dust; and
    thereafter pressing a layer of loose metal chips down with another die onto the rim of the cavity and the dust in the cavity to make a cover upwardly closing the cavity.

4. The process defined in claim 3, wherein the cup and the cover together are shaped as a cone, a cube or a bar.

5. The process defined in claim 3 wherein the other die is a male die fittable in the female die.

* * * * *